US006600752B1

(12) United States Patent
Duong-Van

(10) Patent No.: US 6,600,752 B1
(45) Date of Patent: Jul. 29, 2003

(54) METHOD FOR REDUCING EXCESS QUEUE TIME IN COMMUNICATION NODES

(75) Inventor: Minh Duong-Van, Menlo Park, CA (US)

(73) Assignee: Network Physics, Mountain View, CA (US)

( * ) Notice: Subject to any disclaimer, the term of this patent is extended or adjusted under 35 U.S.C. 154(b) by 0 days.

(21) Appl. No.: 09/345,249

(22) Filed: Jun. 30, 1999

(51) Int. Cl.⁷ .................................................. H04L 12/28
(52) U.S. Cl. ........................................ 370/412; 370/414
(58) Field of Search ................................ 370/267, 412, 370/414, 397, 395.42; 709/314

(56) References Cited

U.S. PATENT DOCUMENTS

| | | | |
|---|---|---|---|
| 3,686,641 A | * | 8/1972 | Logan et al. ............... 709/314 |
| 5,127,001 A | * | 6/1992 | Steagall et al. ............ 370/267 |
| 5,193,151 A | | 3/1993 | Jain |
| 5,361,372 A | | 11/1994 | Rege et al. |
| 5,457,679 A | | 10/1995 | Eng et al. |
| 5,581,544 A | | 12/1996 | Hamada et al. |
| 5,696,764 A | * | 12/1997 | Soumiya et al. ............ 370/412 |
| 6,058,114 A | * | 5/2000 | Sethuram et al. ........... 370/397 |
| 6,192,028 B1 | | 2/2001 | Simmons et al. |
| 6,377,546 B1 | | 4/2002 | Guerin et al. |
| 6,389,019 B1 | * | 5/2002 | Fan et al. ............. 370/395.42 |
| 6,405,256 B1 | | 6/2002 | Lin et al. |
| 6,408,005 B1 | * | 6/2002 | Fan et al. .................... 370/412 |

* cited by examiner

*Primary Examiner*—Salvatore Cangialosi
(74) *Attorney, Agent, or Firm*—Blakely Sokoloff Taylor & Zafman LLP

(57) ABSTRACT

A queue length for a queue storing packets transmitted through a communications network is temporarily increased at a time instant corresponding to an onset of congestion of the queue for a time period. Increasing the queue length in this way may be accommodated by providing an auxiliary storage area for packets that would otherwise be stored in the queue. The auxiliary storage area may be associated with a different physical storage device than a storage device associated with the queue.

7 Claims, 2 Drawing Sheets

METHOD FOR REDUCING EXCESS QUEUE TIME IN COMMUNICATION NODES

FIELD OF THE INVENTION

The present invention relates to a scheme for congestion control/avoidance in communication networks that rely on packet switching techniques to transport information between nodes therein.

BACKGROUND

Many communication networks, such as the Internet, rely on packet switching technologies (e.g., X.25, frame relay, asynchronous transfer mode, etc.) to transport variable or uniform blocks (usually termed packets or cells) of data between nodes. The term packet will be used herein to collectively refer to any such block of information. Such networks generally perform two major functions: routing and congestion control. The object of routing is to deliver, correctly and sometimes in sequence, the packets from a source to a destination. The object of congestion control is to maintain the number of packets within the network (or a region or sub-network thereof) below a level at which queuing delays become excessive. Often, where queuing delays are significant, packets are dropped.

In essence, a packet switched network is a network of queues communicatively coupled together by communication links (which may be made up of various physical media). At each network node (e.g., a switch or router), there exists one or more queues of packets for each outgoing link. If the rate at which packets arrive and queue up exceeds the rate at which packets are transmitted, queue size grows without bound and the delay experienced by a packet tends towards infinity. Even if the packet arrival rate is less than the packet transmission rate, queue length may grow dramatically as the arrival rate approaches the transmission rate.

In an ideal case, network throughput, and hence network use, should increase to an offered load up to the physical capacity of the network and remain at capacity if the load is further increased. This ideal case, however, requires that all nodes somehow know the timing and rate of packets that will be presented to the network with no overload and no delay in acquiring this information; a situation which is not possible. If no congestion control is exercised, as the load increases, use increases for a while. Then, as the queue lengths at various nodes begins to grow, throughput actually drops. This is due to the fact that the queues are constrained to a finite length by the physical size of the memories in which they exist. When a node's memory (i.e., its queues) is full, it must drop (i.e., discard) additional incoming packets. Thus, the source is forced to retransmit these packets in addition to any new packets it might have. This only serves to worsen the situation. As more and more packets are retransmitted, the load on the network grows and more and more nodes become saturated. Eventually, even a successfully delivered packet may be retransmitted because it takes so long to get to its destination (whereupon it may be acknowledged by the destination node) that the source actually assumes that the packet was lost and it tries again. Under such circumstances, the effective capacity of the network is virtually zero.

Contrary to what one might believe, the solution to this problem is not to simply allow the queue lengths to grow indefinitely. Indeed, it has been shown that even where queue lengths are allowed to be infinite, congestion can occur. See, e.g., John Nagle, "On Packet Switches with Infinite Storage", Network Working Group, Internet Engineering Task Force, RFC 970 (1985). One reason that this is true is that packets are often coded with an upper bound on their life, thus causing expired packets to be dropped and retransmitted, adding to the already overwhelming volume of traffic within the network.

It is clear that catastrophic network failures due to congestion should (indeed, must) be avoided and preventing such failures is the task of congestion control processes within packet switched networks. To date, however, the object of such congestion control processes has been to limit queue lengths at the various network nodes so as to avoid throughput collapse. Such techniques require the transmission of some control information between the nodes and this overhead itself tends to limit the available network bandwidth for data traffic. Nevertheless, a good congestion control process maintains a throughput that differs from a theoretical ideal by an amount roughly equal to its control overhead.

In addition to imposing limits on the true available throughout of a network, conventional congestion control processes do not take into account the true nature of network traffic. Existing approaches have generally viewed network traffic (e.g., the generation of new packets to be injected into a network) as essentially random processes. However, recent work in the area of traffic modeling has shown that network traffic is in fact fractal in nature. None of the currently proposed congestion control methodologies capture or exploit this characteristic.

The concept of fractality can be illustrated in Cantor Sets. Consider a line segment of length 1 unit. Now divide this line segment into three equal parts and remove the middle third. Two smaller segments of length ⅓ unit remain. Now divide each of these segments into three again and remove the corresponding middle thirds. In this generation of line segments there are four separate segments, each of length ⅑ unit. This process can be repeated ad infinitum, with a basic pattern appearing in each generation of line segments at all scales. This construction of so-called Cantor Sets is fractal. Mathematically, the degree of fractality can be stated by a measure known as the fractal dimension.

Network traffic, including Internet traffic, exhibits the same sort of fractal properties as the Cantor Sets of line segments described above. That is, it has been discovered that when a measure of data units (e.g., bits) per time interval is plotted against time, a persistent behavior is noted at all time scales. So, a plot of bits/hour versus hours shows the same persistent pattern as a plot of bits/minute versus minutes, and bits/second versus seconds and so on. If traffic flow in a network were truly random (as had been postulated in the past and upon which assumptions current congestion control methodologies were based), then at some (large) time scale, burstiness should appear. This burstiness should then disappear as the time scale is reduced, resulting in a random distribution. The experiments mentioned above, however, have shown that this does not occur. Instead, the same persistent patterns of traffic flow that are present at large time scales are observed at small time scales. Furthermore, the traffic flow (i.e., the number of bytes per unit of time) is chaotic. The degree of chaoticness can by quantified by the mathematical concept called fractal dimension. With this range of fractal dimension, the applicant has discovered that the chaos of the traffic flow can be controlled using the methods described below.

As indicated above, current congestion control processes simply do not take the fractal network traffic characteristics into account and, therefore, cannot be expected to be optimum solutions to the congestion problem. What is needed therefore, is a congestion control scheme which does account for the fractal nature of network traffic flow.

SUMMARY OF THE INVENTION

In one embodiment of the present scheme for congestion control, a queue length for a queue storing packets transmitted through a communications network is temporarily increased at a time instant corresponding to an onset of congestion of the queue for a time period. Increasing the queue length in this way may be accommodated by providing an auxiliary storage area for packets that would otherwise be stored in the queue. The auxiliary storage area may be associated with a different physical storage device than a storage device associated with the queue.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

A scheme for reducing or preventing congestion in packet switched networks is disclosed herein. More specifically, the present scheme helps to reduce the amount of queuing time experienced by a packet transported within such a network. Although discussed with reference to certain illustrated embodiments, upon review of this specification, those of ordinary skill in the art will recognize that the present scheme may find application in a variety of systems. Therefore, in the following description the illustrated embodiments should be regarded as exemplary only and should not be deemed to be limiting in scope.

As indicated above, packet switched networks can be regarded as, essentially, a network of queues (also known as buffers). With some nodes of a packet switched network, packets may be initially queued in a low priority queue. If, however, the packets are queued for a length of time exceeding some pre-established threshold (which may, in some cases, be programmable by a user or network manager), then the packets may be "moved" to a high priority queue, which is serviced before the low priority queue. The term "moved" here is not necessarily referring to a physical move. Often, packets are stored in a common memory and pointers thereto are used to represent the packets. Thus, the pointers may be organized within the low and high priority queues (often in linked lists of buffers). Organizing pointers (which generally occupy far less physical memory space than the packets themselves) in this fashion conserves processing time over that which would be required if the packets were to by physically moved between queues, etc.

Figure 1:
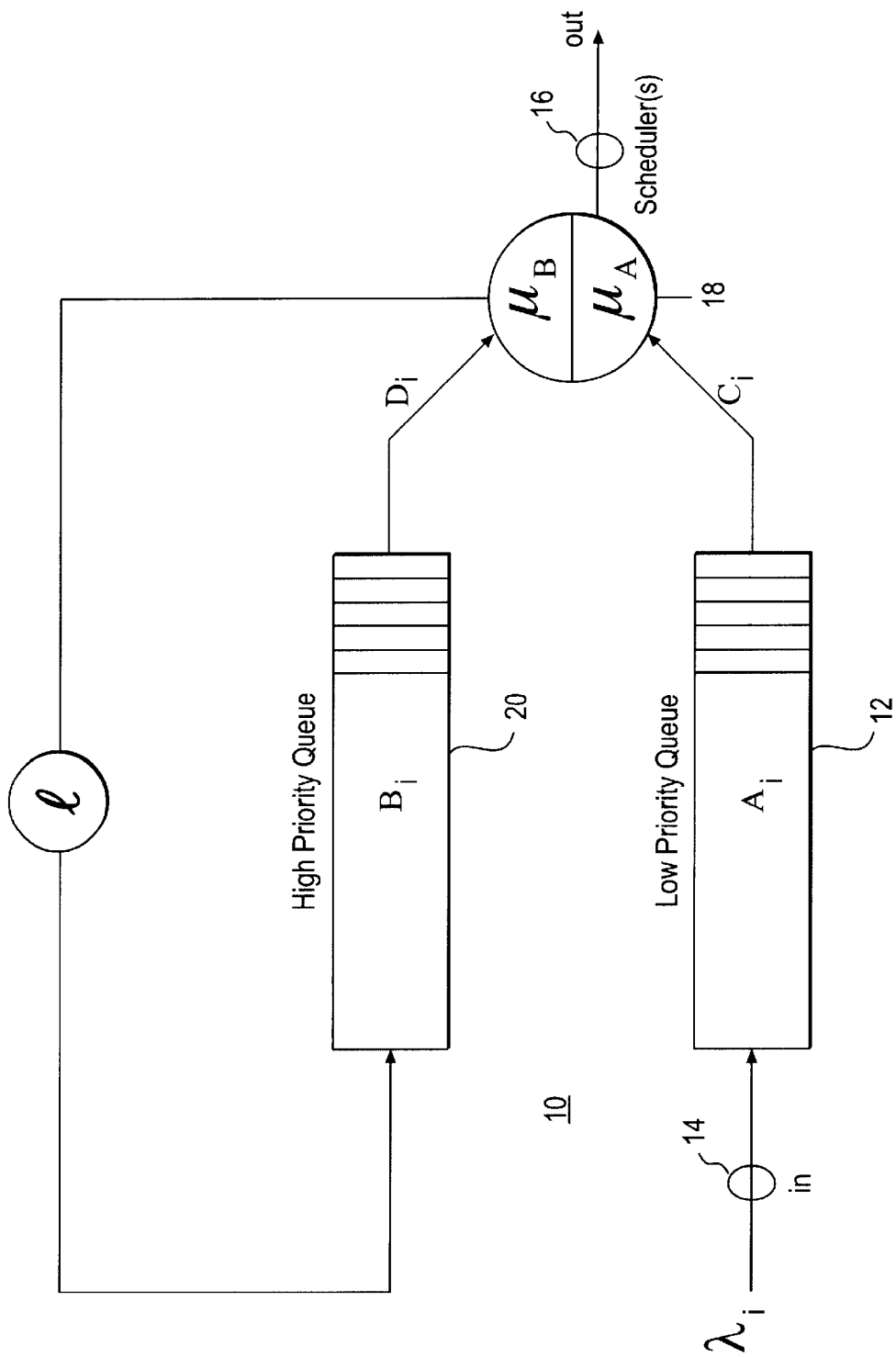
FIG. 1 illustrates a conceptual model of a queuing system.

FIG. 1 illustrates an example of such an arrangement. Queuing system 10 includes a low priority queue 12, which receives packets from a communication link 14 at an input rate $\lambda$. The subscripts "i" are used to indicate that this may be one of many queuing systems in a network node, some or all of which may operate in concert or independently.

Packets are transmitted from low priority queue 12 to an outbound communication link 16 at a rate $\mu_A$, through the action of a scheduler 18. More specifically, $\mu_A$ represents the rate per unit of a scheduler cycle at which the low priority queue can be served. Depending upon the system, one or more packets may be transmitted from the low priority queue 12 during each servicing operation. A servicing operation or scheduler cycle is a generic term used to indicate an operational cycle in which scheduler 18 transmits packets from a queue to an outbound communication link.

If packets are queued in the low priority queue 12 for a length of time greater than an established threshold "l" (i.e., if they are not serviced by scheduler 18 within a certain time interval), the packets are moved to a high priority queue 20. The high priority queue 20 may be substantially similar to the low priority queue 12 and, indeed, the queues may simply be different reserved portions of a common physical memory. The transfer from the low priority queue 12 to the high priority queue 20 may be performed by the scheduler 18 or, in other cases, may be handled by a separate scheduler. Such details are not critical to the present scheme of congestion control.

Packets from the high priority queue 20 are serviced at a rate $\mu_B$, usually different from $\mu_A$. $\mu_B$ represents the rate per unit of a scheduler cycle at which the high priority queue can be served. Often, the service rate for the high priority queue 20 will be less than the service rate for the low priority queue 12, and the high priority queue may only be serviced for a servicing operation time, whether or not all packets are cleared from the queue. The high priority queue 20 may need to be cleared before servicing of the low priority queue 12 is resumed. The high priority queue 20 may be serviced by scheduler 18 or another scheduler. For sake of completeness, the relationships between the queue lengths and output rates can be expressed as:

$$D_i = \min(B_i + C_{i-l}, \mu_B);$$

$$C_i = \min\left(A_i + \lambda_i, \mu_A\left(1 - \frac{D_i}{\mu_B}\right)\right);$$

$$B_{i+1} = B_i + C_{i-l} - D_i; \text{ and}$$

$$A_{i+1} = A_i + \lambda_i - C_i.$$

where:

$A_i$ is the queue length of the low priority queue 12 in the $i^{th}$ interval, $B_i$ is the queue length of the high priority queue 20 in the $i^{th}$ interval, $C_i$ is the outflow of the low priority queue 12 in the $i^{th}$ interval, $D_i$ is the outflow of the high priority queue 20 in the $i^{th}$ interval, $\mu_A$ is the rate per unit of the schedule cycle at which the low priority queue can be served, $\mu_B$ represents the rate per unit of the schedule cycle at which the high priority queue is served, and l is the feedback interval in units of the schedule cycle. Further details of this queueng scheme can be found in Ashok Erramilli and Leonard J. Forys, "Oscillations and Chaos in a Flow Model of a Switching System," IEEE Journal on Selected Areas in Communications, Vol. 9, No. 2, pp. 171–178 (1991).

It has been discovered with such queuing systems that as the input load on the system increases, queuing time increases dramatically (i.e., approximately exponentially). Indeed, this may occur even if the input load remains constant but the service time for the scheduler does not permit all packets from a queue to be transmitted in that time interval. This leads to congestion and catastrophic failure (i.e., a situation similar to that described above where zero throughput is obtained). In fact, this dramatic increase in queuing time is a special case of the overall congestion problems described above.

To overcome the problem of excessive queuing time in systems such as that illustrated in FIG. 1 the present scheme adopts a counter-intuitive approach. Rather than have a packet source slow down (i.e., reduce the number of packets being introduced into system 10), the present scheme actually brings the queuing system to the point of catastrophic failure (i.e., the point of congestion). Then, just prior to the onset of congestion (or at any point prior thereto in the general case), the queuing system is momentarily "shocked" so as to increase the queue capacities or, stated differently, the effective rate per unit cycle at which a queue is served, by increasing the number of packets presented to the scheduler to be served. By "shocked" it is meant that the queuing system is momentarily provided with an effective increase in queue size (either the low priority queue or the high priority queue or both) or serving rate, which relieves the burden on the system as a whole. Physically, this can be implemented in a variety of ways, including enlarging the tray size from which the scheduler 18 serves packets for a momentary period of time (determined by the effective servicing rate). The precise implementation scheme used is not critical to the present invention.

The term shocked is also used to draw an analogy to the operation of heart defibrillators. Ventricular fibrillation is a condition wherein the heart undergoes a series of rapid, uncoordinated contractions, causing weak, ineffectual heartbeats. It has been discovered that fibrillation is, like network traffic flow, a chaotic process that exhibits fractality. Unlike pacemakers, which continuously impart an electrical signal to keep a heart beating properly (not unlike the scheduler of a queuing system), defibrillators pulse only one when a heart is undergoing ventricular fibrillation. The pulse is meant to shock the heart back into regular rhythm.

Like the action of the defibrillator, the present scheme imposes a shock on the queuing system to clear congestion at the moment of its onset. This is a counter-intuitive procedure because ordinarily queuing systems respond to congestion by trying to reduce the influx of packets. Under the present scheme, packets are continually input in order to bring the queuing system to the point of congestion. That is, congestion is viewed as a desirable condition to promote efficient operation of the congestion control methods of the present invention.

In one embodiment, shocking the system in the fashion described above is accomplished by temporarily providing an increased serving tray for a queue. Preferably, it is the low priority queue 12 which is accommodated in this fashion, however, the present methods can be practiced using either or both of the high and/or low priority queues. This temporary increase in serving tray size can be implemented in a variety of ways. For example, one could hold a portion of the memory in which the queues regularly reside in reserve and allow that memory space to be filled on the temporary basis contemplated by the present scheme. Although this method would be suitable for purposes of the present invention, it would not necessarily be a preferred implementation because it seems paradoxical to hold back a portion of available (and in real-world systems always scarce) memory which could be used for other purposes in this fashion.

So, rather than simply reserving a portion of available memory for the temporary serving tray size increase, the preferred implementation of the present scheme employs an external memory which can be made available to queuing system 10 (and many others) on a temporary or periodic basis. In other words, an external memory (or some other auxiliary storage area) can be communicatively coupled to queuing system 10 that will allow packets to be stored on a temporary basis. These packets could be the packets that are already stored in the low and/or high priority queues 12 and/or 20, and/or they may be newly arrived packets from communication link 14. The packets are then serviced from this temporary storage location. The external memory can be shared by a number of queuing systems 10, which need not even be associated with the same node (although they certainly may be).

The term serving tray as used above is meant to describe a buffer of packets to be served by the scheduler 18. That is, the scheduler may be modeled as a buffer of a certain size, with packets being moved into that buffer from the queues 12 and 20, in accordance with the above flow equations. The task of the scheduler may thus be viewed as clearing this buffer by sending the packets placed therein to the output communication link 16.

Figure 2:
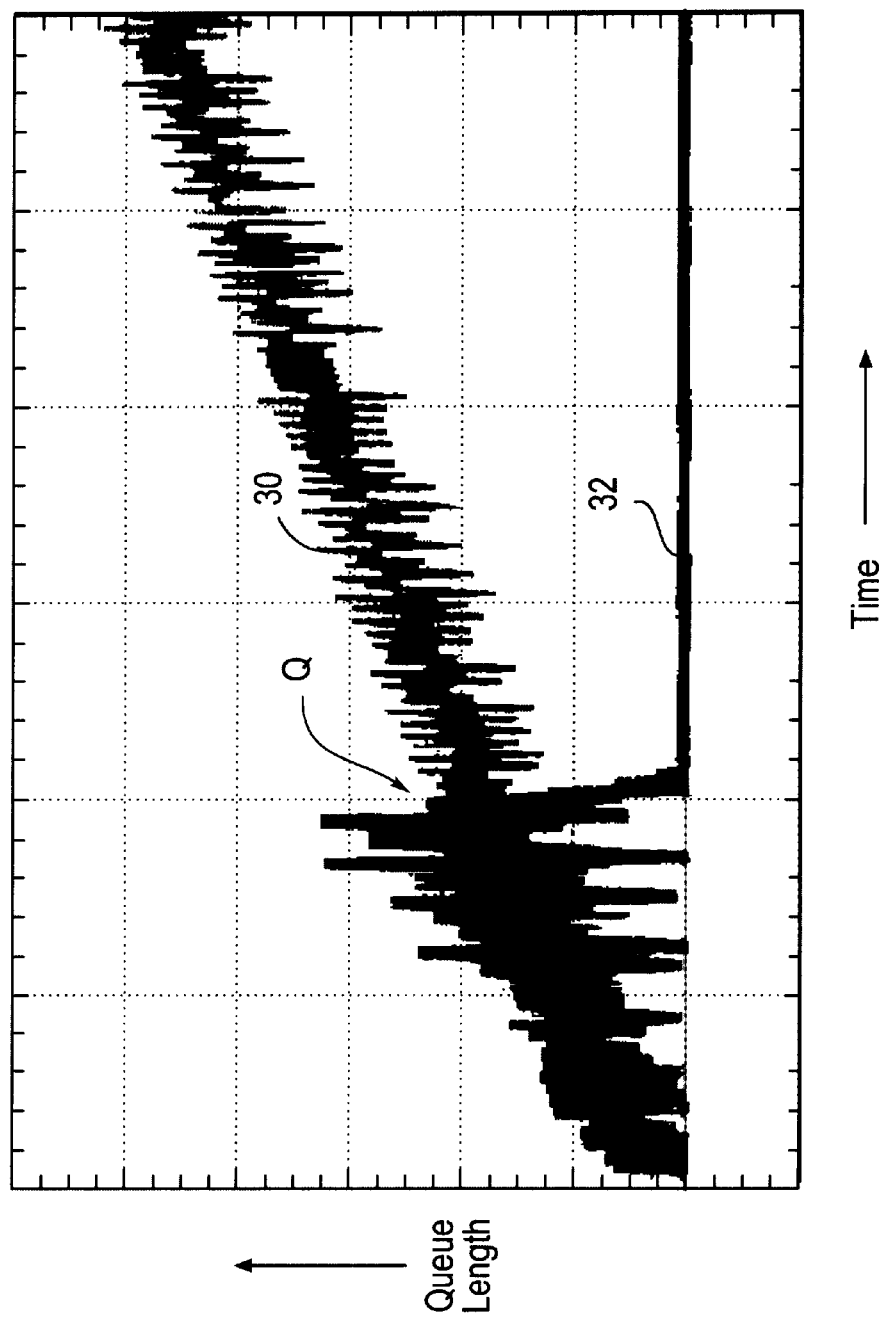
FIG. 2 is a graphical representation of queue lengths that may be experienced within the queuing system of FIG. 1 under constant load both before and after application of a temporary increase in queue size in accordance with an embodiment of the present invention.

In each operational cycle of the scheduler, there will be a variable number of packets awaiting transfer to the serving tray, but the serving tray remains of fixed size. The number of packets moved into the serving tray is governed by the relative sizes of the queues and the input rate to the low priority queue, and is described by the variables "C" and "D" in the above expressions. As congestion begins to occur, the number of packets so transferred to the serving tray decreases, and the queuing time experienced by a packet increases correspondingly. This phenomenon is illustrated graphically in FIG. 2.

In the illustration, curve 30 represents a queue length of a hypothetical queue (it can be either the high priority queue 20 or the low priority queue 12) of a queuing system similar to that shown in FIG. 1 under heavy load, over time. As shown, although the moment-to-moment queue length varies (shown in the perturbations in the curve), the overall trend over time is an ever increasing queue length. Thus, if the queue were allowed to grow without bound, packets would remain in the queue for an ever increasing period with time. In practice of course, the queue length is fixed and when this boundary is reached, newly arriving packets are dropped.

To combat the effect of this ever increasing queue time, at an instant "Q" the queuing system is shocked in the manner described above. Notice the dramatic effect of this action as shown by curve 32. Instead of the ever increasing queue size, the momentary shocking of the queuing system has resulted in a constant, and in this example near zero, queue length. This translates to a constant, and here near zero, queuing delay for packets transiting the queuing system.

It is important to realize that the load conditions have not been varied for curves 30 and 32. That is, the same load conditions experienced by the queuing system that led to curve 30 being produced are present during the recording of data that led to curve 32. This means that a single shock to the queuing system has caused the queuing system to enter a steady state where, for these load conditions, a constant (and near zero) queuing delay will be experienced.

The type of shock applied may be the temporary increase in serving tray size discussed above. That is a temporary increase in the number of packets made available to the scheduler 18 for service in a unit time is provided. In essence, this is a temporary increase in the effective rate per unit of the schedule cycle at which the queue is served. This may be accomplished by moving all of the then queued packets into the serving tray and allowing the scheduler to service those packets.

Thus a scheme for reducing or preventing congestion in packet switched networks has been described. Although the foregoing description and accompanying figures discuss and illustrate specific embodiments, it should be appreciated that the present invention is to be measured only in terms of the claims that follow.

What is claimed is:

1. A method, comprising temporarily increasing a number of packets made available to a scheduler of a node of a packet-switched network, the increase being for a scheduler cycle time, wherein said node includes one or more queues of packets serviced by said scheduler and the increase is performed at a time corresponding to an onset of congestion at said node.

2. The method of claim 1, wherein temporarily increasing the number of packets made available to said scheduler comprises presenting all then-queued packets to be serviced by said scheduler for service by said scheduler during said scheduler cycle time.

3. The method of claim 2, wherein presenting all then-queued packets comprises increasing tray size of a servicing tray accessed by said scheduler and moving said then-queued packets into said serving tray.

4. A method, comprising temporarily enlarging a tray size of a serving tray from which a scheduler of a node of a packet-switched network services enqueued packets for a period of time determined by an effective serving rate for said scheduler and at a point in time corresponding to an onset of congestion at said node.

5. The method of claim 4, wherein temporarily enlarging the tray size of the serving tray comprises enlarging a memory system external to said node to temporarily store said enqueued packets.

6. The method of claim 4, wherein said packets are enqueued in a low priority queue.

7. The method of claim 4, wherein at least some of said packets are enqueued in a high priority queue.

* * * * *